March 12, 1957  C. H. JORDAN  2,784,856
HAND TRUCK FOR GARBAGE OR ASH CANS
Filed Feb. 10, 1955  2 Sheets-Sheet 1
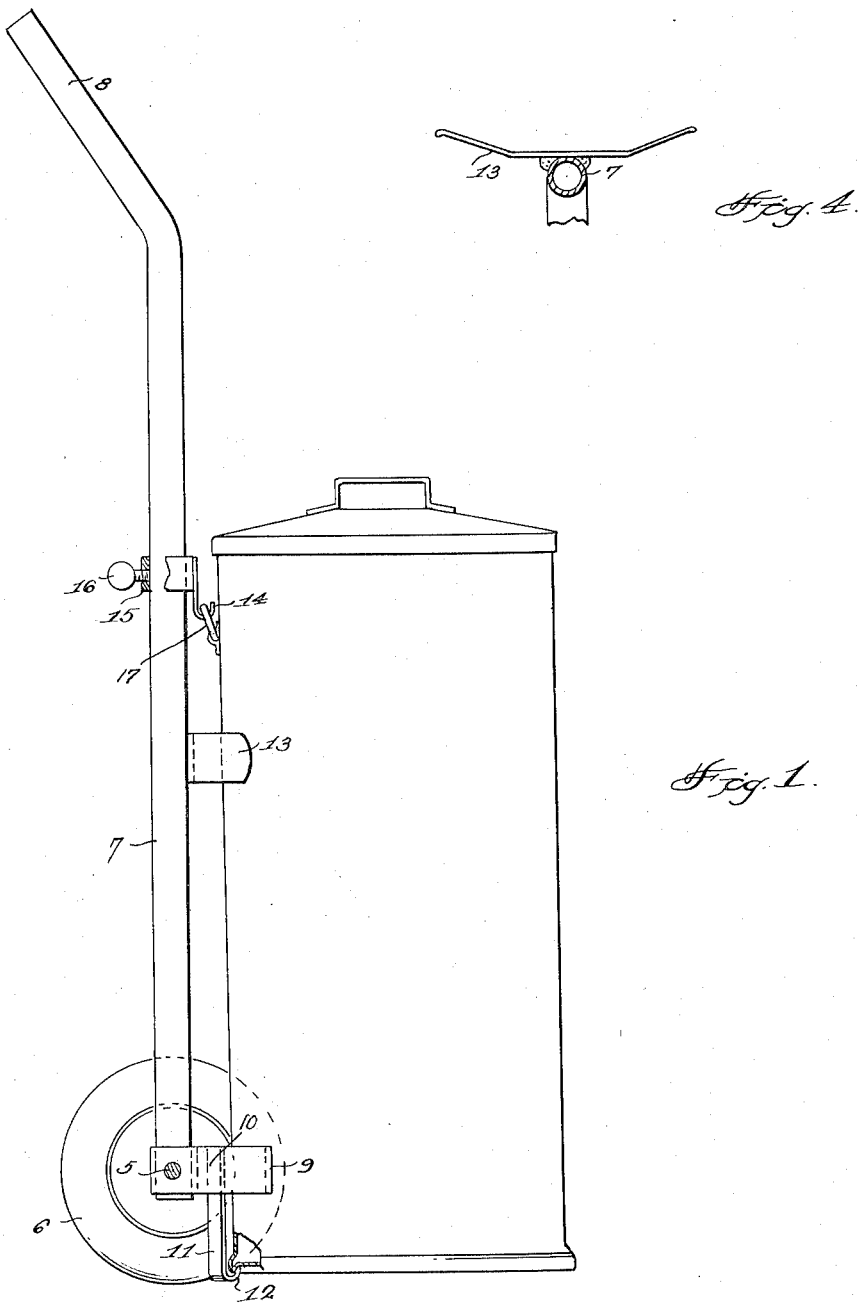
CONRAD. H. JORDAN INVENTOR
BY *CASnow&Co.*
ATTORNEYS.

March 12, 1957  C. H. JORDAN  2,784,856
HAND TRUCK FOR GARBAGE OR ASH CANS
Filed Feb. 10, 1955  2 Sheets-Sheet 2
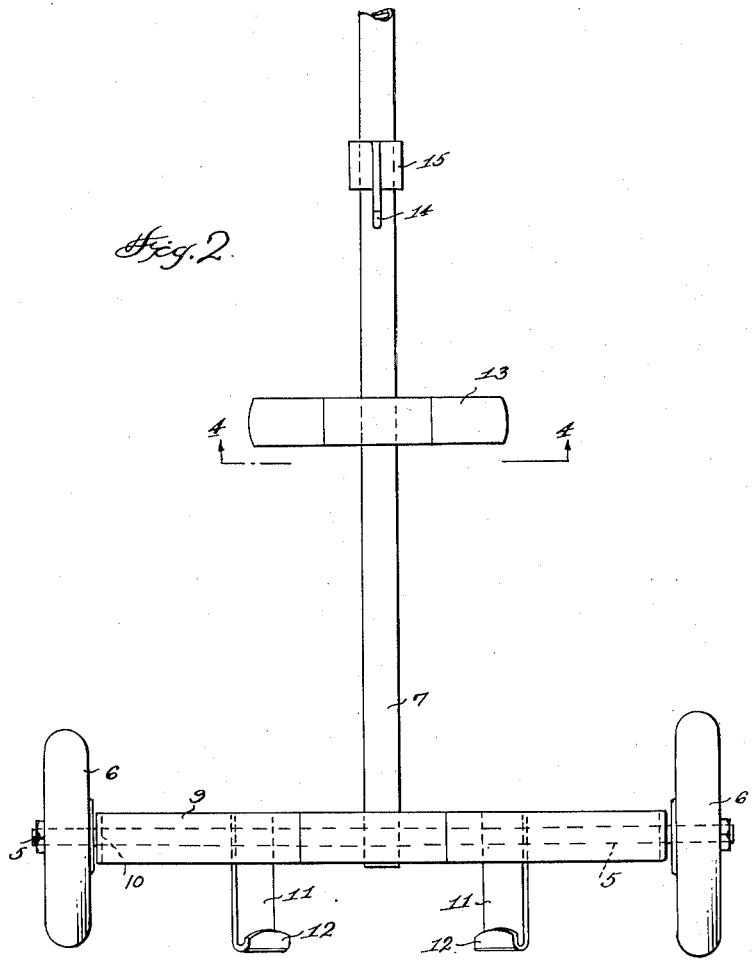
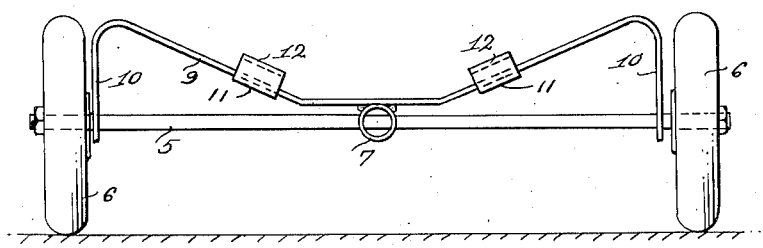
CONRAD H. JORDAN INVENTOR
BY
ATTORNEYS.

2,784,856

HAND TRUCK FOR GARBAGE OR ASH CANS

Conrad H. Jordan, Burlington, N. C.

Application February 10, 1955, Serial No. 487,290

1 Claim. (Cl. 214—383)

This invention relates to a cart designed for supporting and moving cans in which garbage, ashes, rubbish or the like heavy materials are contained.

The primary object of the invention is to provide a cart of this character having hooks which are so arranged that they may be readily positioned under the bottom rim of a can, which bottom rim extends below the bottom of the can, by merely tilting the can forwardly and sliding said hooks into position.

Another object of the invention is to provide a cart which because of its adjustability will permit the use of the cart in lifting and moving cans of various sizes.

A further object of the invention is to provide a cart wherein an adjustable hook is provided for connection with the handle of a can and which may be hooked over the upper edge of a can, wherein the can is not equipped with a handle.

Another object of the invention is to provide a cart having means for steadying and securing the can on the cart while the cart is being rolled over rough or irregular surfaces.

Still another object of the invention is to provide a hook adjustably mounted on the handle of the cart, so that such hook may be hooked into the handle of the can to balance and hold the can in position on the cart for ease in handling.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is an elevational view illustrating a cart constructed in accordance with the invention, showing a garbage or trash can as positioned thereon.

Figure 2 is a front elevational view of the cart.

Figure 3 is a bottom view of the cart.

Figure 4 is a sectional view taken on line 4—4 of Figure 2.

Referring to the drawings in detail, the cart comprises an axle 5 on which the supporting wheels 6 are mounted.

The reference character 7 indicates a bar that has its lower end secured to the axle, the other end of the bar being extended laterally providing a handle 8 for effecting movement of the cart.

The cart also embodies a base 9 which is also in the form of a bar, the base 9 having laterally extended ends 10 formed with openings to receive the axle 5, as better shown by Figure 3 of the drawings.

The base 9 is welded or otherwise secured to the bar 7, at a point adjacent to the axle, thereby securing the bar or base 9 to the axle 5.

Because the ends of the base 9 extend laterally, it will be seen that the forward surface of the base 9 is somewhat curved, to conform to the curvature of a garbage or ash can of conventional structure.

Hooks 11 are secured to the base 9 in spaced relation with respect to each other, and have their ends 12 disposed in a line with the foremost points of the wheels 6, and since the cart will be tilted rearwardly slightly, when in use, the hooks 11 will of course clear the ground surface so that the cart can be rolled.

Disposed substantially midway of the length of the bar 7 is the curved brace 13 which is designed to engage the can held in the hooks 11, and prevent twisting or rolling of the can from the cart.

The cart also includes the hook 14 which comprises a collar 15 that is designed to move longitudinally of the bar 7, the collar 15 being held in its positions of adjustment along the bar 7 by set screw 16.

The hook 14 is designed to hook into the handle of the can supported on the cart, the handle in the present showing being indicated by the reference character 17.

From the foregoing it will be seen that due to the construction shown and described, I have provided a handy cart which may be moved so that the hooks at the lower end of the cart may hook over the bottom band of a garbage or ash can, securing the can to the cart. It will also be noted that the hook 14 may be hooked into the handle of a can in such a way that the can will be securely held to the cart against accidental displacement.

Having thus described the invention what is claimed is:

A hand truck for garbage or ash cans comprising an axle, a pair of wheels rotatably carried by said axle, an elongated handle fixed to said axle and extending right-angularly therefrom, a flat base bar fixed to said axle and handle, said base bar comprising a central part fixed to said handle and disposed parallel to said axle, a pair of outwardly divergent members extending from said central part, a pair of outer members extending at an acute angle from the outer ends of said divergent members and fixed to said axle adjacent the inner sides of said wheels, a pair of depending can engaging hooks carried by said divergent members, a curved brace fixed to said handle between the ends thereof for engagement with the side of the can, a collar slidable on said handle above said brace, a depending hook fixed to said collar and engageable with the looped handle of a can, and a set screw threaded through said collar for securing the latter in adjusted position along said handle.

References Cited in the file of this patent

UNITED STATES PATENTS

| | | |
|---|---|---|
| 2,044,363 | Morse et al. | June 16, 1936 |
| 2,574,825 | Guild | Nov. 13, 1951 |
| 2,673,654 | Kaufman | Mar. 30, 1954 |
| 2,704,165 | Hoover | Mar. 15, 1955 |